United States Patent
Durkheim (10) Patent No.: US 9,309,639 B2
(45) Date of Patent: Apr. 12, 2016

(54) SYSTEM, METHOD, CONNECTOR AND GEOCOMPOSITE FOR FLUID RECOVERY

(75) Inventor: Yves Durkheim, Chartres (FR)

(73) Assignee: AFITEX INTERNATIONAL, Chartres (FR)

( * ) Notice: Subject to any disclaimer, the term of this patent is extended or adjusted under 35 U.S.C. 154(b) by 72 days.

(21) Appl. No.: 13/983,186

(22) PCT Filed: Feb. 10, 2012

(86) PCT No.: PCT/FR2012/050303
§ 371 (c)(1),
(2), (4) Date: Oct. 15, 2013

(87) PCT Pub. No.: WO2012/107703
PCT Pub. Date: Aug. 16, 2012

(65) Prior Publication Data
US 2014/0030020 A1    Jan. 30, 2014

(30) Foreign Application Priority Data
Feb. 10, 2011  (FR) .................................... 11 51079

(51) Int. Cl.
*E02B 11/00* (2006.01)
*B09B 1/00* (2006.01)
*E01C 13/02* (2006.01)

(52) U.S. Cl.
CPC ............. *E02B 11/005* (2013.01); *B09B 1/00* (2013.01); *E01C 13/02* (2013.01)

(58) Field of Classification Search
USPC ............................. 405/36, 38, 43, 45, 50, 51
See application file for complete search history.

(56) References Cited

U.S. PATENT DOCUMENTS

| | | | | |
|---|---|---|---|---|
| 3,461,675 A * | 8/1969 | Izatt | ................................ | 405/38 |
| 4,721,408 A * | 1/1988 | Hewlett | .......................... | 405/48 |
| 4,733,989 A | 3/1988 | Harriett | | |
| 5,219,243 A * | 6/1993 | McCoy | ........................... | 405/43 |
| 2005/0025582 A1 | 2/2005 | Ianniello | | |
| 2006/0254672 A1 | 11/2006 | Mitoraj | | |

FOREIGN PATENT DOCUMENTS

EP    0775512    * 11/1996
FR    2746424    * 9/1997

OTHER PUBLICATIONS

International Search Report from corresponding PCT application No. PCT/FR2012/050303.

* cited by examiner

*Primary Examiner* — Sean Andrish
(74) *Attorney, Agent, or Firm* — Hauptman Ham, LLP (57) ABSTRACT

The present invention relates to a system, a method, a geocomposite and a fluid recovery connector in aggregates 5 (S), the system being characterized in that it comprises, on the one hand, at least one layer, so-called barrier layer (5), having permeability adapted to the blockage of fluid (G, L) and beneath which is arranged at least one geocomposite (2) comprising perforated mini-drains (23) and at least one layer, so-called 10 through layer (22) having permeability adapted to the passage of fluid (G, L), and on the other hand, connectors (4) arranged to connect the perforated mini-drains (23) to discharge pipes (3) connected to at least one pumping device (6), such that at least one fluid (G, L) present in the aggregates (S) can reach the interior of the perforated mini-drains (23) and be discharged to 15 the pumping device (6).

19 Claims, 7 Drawing Sheets

SYSTEM, METHOD, CONNECTOR AND GEOCOMPOSITE FOR FLUID RECOVERY

BACKGROUND

The present invention relates to the field of fluid recovery systems, especially in soils. The invention applies for example to the recovery of gas but also liquids, in particular in aggregates such as soils, sediments, waste, etc. In general, the invention applies to any type of fluid which can be present in aggregates and can be implemented in soils in general, for example under works, such as retention ponds or construction foundations, in landfill waste or in sediments of various types.

Geocomposites and laminar products intended for drainage applications, comprising at least one layer or draining layer and at least one layer of watertight material are known from the prior art, especially from the applications of patent FR2746424 and U.S. Pat. No. 4,733,989. However, these solutions have the disadvantages of not allowing sufficiently efficacious fluid recovery and not resolving some problems in the field of fluid recovery.

A first problem in the field of fluid recovery systems relates to the fact that it is generally difficult to recover fluids present in aggregates, in particular when the aim is to recover gases. For example, gas recovery systems comprising wells and/or trenches made within waste for collecting gases which escape from the latter especially during decomposition of organic waste are known in waste landfill of the prior art, especially in buried landfill. These systems have the disadvantages of being costly and complex to put in place, as they need to provide wells and collecting trenches within waste during burying of the latter. In addition, the recovery of gases generally takes place only around wells and trenches, whereas a non-negligible quantity of gas can reach the surface of the landfill, which creates problems, of pollution especially. Similarly, in the field of building or public works, and in general in various types of works, the problem of the recovery of gas arises frequently, especially under water retention ponds or under construction foundations. In fact, water retention ponds are arranged on a support watertight to liquids and construction foundations are generally arranged on a support impervious to water and/or gas (such as a membrane made of polyane or polyethylene, for example) or are arranged directly on the soil (or the sub-soil in the case of excavations). It is frequent for gas to rise from depths of soils and their accumulation under the works presents risks for the latter.

A second problem, which also arises in the fields of waste and constructions, relates to the fact that known gas recovery systems are generally not adapted to the recovery of liquid. For example, the wells and trenches used in landfill are arranged for the recovery of gas, but liquids which penetrate here flow to the bottom and need to provide additional devices specific to their recovery. The gas recovery system therefore needs to be complemented by a liquid recovery system, which has disadvantages in costs and execution complexity.

SUMMARY

In this context, it is understood that it is interesting to propose a fluid recovery system which is effective, easy and inexpensive to execute and which optionally recovers various types of fluid, and in particular recovers both gases and liquids.

An aim of the present invention is to rectify at least some disadvantages of the prior art by proposing especially a fluid recovery system in aggregates, which is inexpensive and efficacious.

This aim is attained by a fluid recovery system, intended for fluid recovery in aggregates, characterised in that it comprises, on the one hand, at least one layer, so-called barrier layer, having permeability adapted to the blockage of fluid and beneath which is arranged at least one geocomposite comprising perforated mini-drains and at least one layer, so-called through layer, having permeability adapted to the passage of fluid, and on the other hand, connectors arranged to connect the perforated mini-drains to discharge pipes connected to at least one pumping device, such that at least one fluid present in the aggregates can reach the interior of the perforated mini-drains and be discharged to the pumping device.

According to another particular feature, the system is arranged substantially horizontally and organised into a plurality of strips distributed inside the aggregates and/or into a cover covering substantially the entire surface of the aggregates.

According to another particular feature, said geocomposite comprises at least one second through layer arranged to the other side of the perforated mini-drains relative to the first through layer.

According to another particular feature, the permeabilities of the through and barrier layers are adapted so that the fluids preferably borrow the discharge path via the mini-drains, the connectors and the discharge pipes.

According to another particular feature, the connector comprises at least one recovery conduit arranged to be connected to at least one perforated mini-drain and at least one collection conduit arranged to be connected to at least one discharge pipe, the interior of the recovery conduit being in communication with the interior of the collection conduit.

According to another particular feature, the recovery conduit has form and dimensions adapted to those of the perforated mini-drains and the collection conduit has form and dimensions adapted to those of the discharge pipes, such that the connector is arranged on a connection with the mini-drains and the discharge pipes via nesting.

According to another particular feature, the interior of the recovery conduit is in communication with the interior of the collection conduit by means of at least one connection conduit whereof the internal walls terminate on the internal walls of the recovery conduit and of the collection conduit.

According to another particular feature, the conduits of the connector are each oriented according to at least one respective longitudinal axis and the connection conduit is arranged so that its longitudinal axis is non parallel to the axes of the other conduits and crosses the transversal cross-section of at least one of these other conduits near the periphery of this transversal cross-section.

According to another particular feature, the barrier layer is integrated on the geocomposite by needle-bonding on the through layer except at the level of the mini-drains, so as to form a barrier to the passage of fluids only about the mini-drains.

Another aim of the present invention is to rectify at least some disadvantages of the prior art by proposing a fluid recovery geocomposite in aggregates, which is practical to use, inexpensive and effective.

This aim is attained by a fluid recovery geocomposite, intended for fluid recovery in aggregates, characterised in that it comprises, on the one hand, at least one layer, so-called through layer, having permeability adapted to the passage of fluid and fitted with perforated mini-drains and, on the other hand, at least one layer, so-called barrier layer, having permeability adapted to the blockage of fluid and needle-bonded on the through layer except at the level of the mini-drains, such that the barrier layer forms a barrier to the passage of fluids only at the level of the mini-drains.

Another aim of the present invention is to rectify at least some disadvantages of the prior art by proposing a method for fluid recovery in aggregates, which is inexpensive and efficacious.

This aim is attained by a method for fluid recovery in aggregates, characterised in that it comprises a step for laying, in contact with the aggregates, of at least one geocomposite comprising at least one layer, so-called through layer, and perforated mini-drains, a step for laying discharge pipes connected to at least one pumping device, a step of connecting the perforated mini-drains to the discharge pipes by means of adapted connectors, and a step for laying of at least one so-called barrier layer, such that at least one fluid present in the aggregates can reach the interior of the perforated mini-drains and be discharged to the pumping device.

According to another particular feature, the connection step is obtained via nesting between a recovery conduit of the connector and perforated mini-drains, because of form and dimensions of the recovery conduit adapted to those of the perforated mini-drains and via nesting between a collection conduit of the connector and discharge pipes, because of form and dimensions of the collection conduit adapted to those of the discharge pipes.

According to another particular feature, the steps for laying of the geocomposite and for laying of the barrier layer are executed simultaneously due to the fact that the barrier layer is integrated into the geocomposite.

According to another particular feature, the steps of the method are executed for strips of geocomposite and barrier layer, distributed within the aggregates because of the successive reiterations of the steps of the method during successive steps of depositing of strata of aggregates.

According to another particular feature, the steps of the method are executed at the surface of the aggregates to cover the latter with a cover comprising the geocomposite and the barrier layer.

Another aim of the present invention is to rectify at least some disadvantages of the prior art by proposing a fluid recovery connector in aggregates, which is inexpensive and easy to use.

This aim is attained by a fluid recovery connector in aggregates, characterised in that it comprises, on the one hand, at least one recovery conduit arranged to be connected to at least one perforated mini-drain of at least one geocomposite comprising at least one layer and perforated mini-drains and, on the other hand, at least one collection conduit arranged to be connected to at least one discharge pipe connected to at least one pumping device, the interior of the recovery conduit being in communication with the interior of the collection conduit, such that fluid, present in the aggregate and reaching the interior of the mini-drains, is discharged to the pumping device.

According to another particular feature, the recovery conduit has form and dimensions adapted to those of the perforated mini-drains and the collection conduit has form and dimensions adapted to those of the discharge pipes, such that the connector is arranged on a connection via nesting with the mini-drains and the discharge pipes.

According to another particular feature, the interior of the recovery conduit is in communication with the interior of the collection conduit by means of at least one connection conduit whereof the internal walls terminate on the internal walls of the recovery conduit and of the collection conduit.

According to another particular feature, the conduits of the connector are each oriented according to at least one respective longitudinal axis and the connection conduit is arranged so that its longitudinal axis is non parallel to the axes of the other conduits and crosses the transversal cross-section of at least one of these other conduits near the periphery of this transversal cross-section.

BRIEF DESCRIPTION OF THE DRAWINGS

Other particular features and advantages of the present invention will emerge more clearly from the following description, given in reference to the attached figures, in which.

DETAILED DESCRIPTION

The present invention relates to a system, a method, a geocomposite (2) and a connector (4) for fluid recovery, in particular in aggregates (S). The term <<aggregate>> is used here in its general accepted form of <<assembly of a set of separate elements, of identical or different nature>>. This term is used in the plural to mean that it optionally combines numerous elements but can in fact consist of a single type of aggregate, itself containing a single type of element or several heterogeneous elements. In general, the use of the singular or plural in the present application is non-limiting. The term aggregate therefore covers, inter alia, the definition of soils, sediments, sludge or waste. For example, this aggregate could in fact be the soil on which and/or in which the present invention is implemented. The skilled person will understand from viewing the present application that this term is not limited to the examples provided here and that the invention can be used for any type of element(s) as long as fluid can pass through the element or the elements comprising the aggregate or the aggregates.

In general, the present invention responds to the problem of discharge of fluids, especially gases but also liquids, which are present in aggregates (soils, sediments, waste, etc.). The present invention is particularly effective for fluid recovery in waste, especially buried landfill for example. It is generally preferable to recover fluids present in landfill as they constitute a source of pollution (especially atmospheric for gaseous fluids and soils and sub-soils for liquids). The present invention can also be used in the field of works such as building or the public works under which it is preferable not to let fluids accumulate, especially gaseous fluids (G). The present invention benefits from the fact that fluids are generally capable of passing through aggregates (S) and collects them. The skilled person will understand from reading the present application that the fluids concerned are generally gaseous fluids (G) but that some embodiments of the invention also allow liquid fluid recovery (L).

Figure 3A:
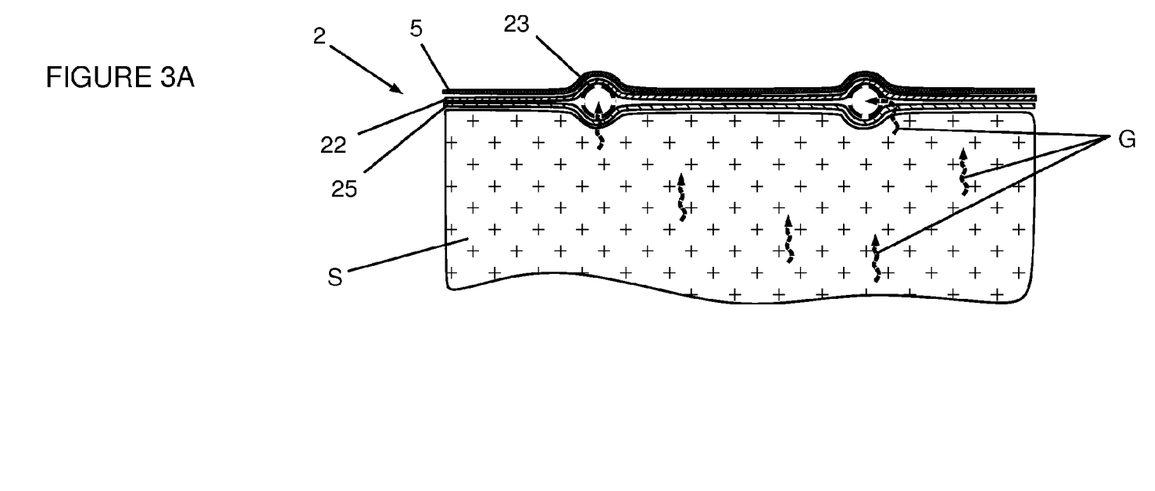
Figure 4A:
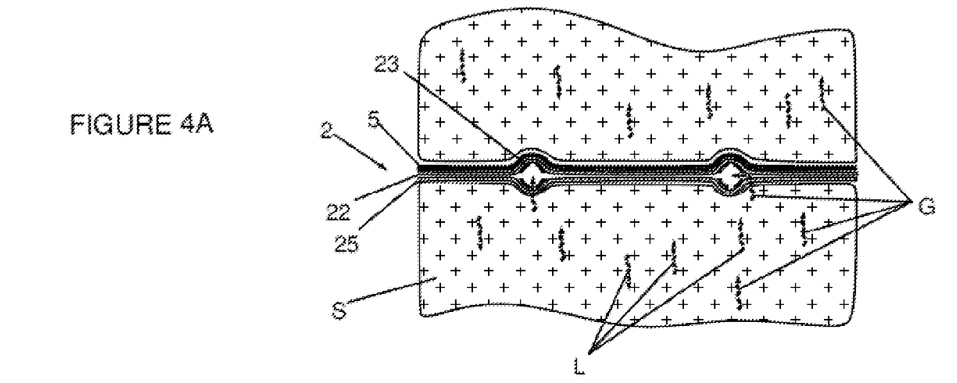
Figure 4B:
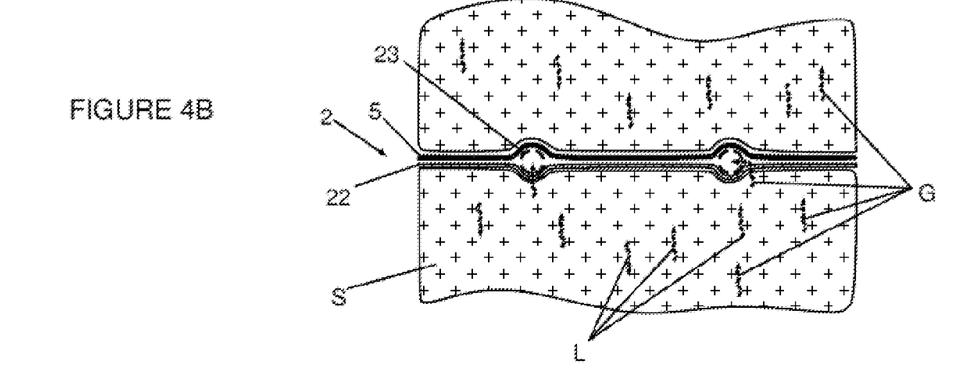

The present invention uses at least one geocomposite (2). This geocomposite (2) comprises at least one layer (22), so-called through layer, arranged to intercept fluid(s) and perforated mini-drains (23) arranged to collect and drain fluid(s) intercepted by the layer or layers of the geocomposite (2). The present application details the various types of layers and materials and it will be understood from the present description that the aim of this through layer (22) is to channel fluid(s) (G, L). The permeability of this through layer (22) is adapted so that the fluids which the invention aims to recover cannot penetrate the through layer (22). In some embodiments, the geocomposite (2) comprises a layer, so-called barrier layer (5), which is integrated into the geocomposite (2). In other embodiments, this barrier layer (5) is distinct from the geocomposite (2) and is handled separately even though it complements the installation. In the event where the barrier layer (5) is integrated into the geocomposite (2), it can be by needle-bonding on the through layer or by laminating or various techniques for binding these two elements. In the case of needle-bonding, the latter will be preferably carried out on the through layer (22) with the exception of portions located near the perforated mini-drains (23), so as to form a barrier to the passage of fluids (G, L) only about the mini-drains (23). In fact, the barrier layer (5) is arranged to block the passage of fluid (G, L) and the needle-bonding allows the fluid to pass through. The needle-bonding therefore creates an assembly whereof the zones where fluid can pass through can be selected. In the case of integration by adhesion, the result is a substantially impermeable or watertight assembly. The barrier layer (5) has permeability adapted to the blockage of fluid (G, L), that is, it is arranged to stop fluids which would rise from and/or descend into the aggregates (S). In fact, in the aggregates (S), and in particular in soils or waste, it is frequent for gaseous fluids (G) to rise and/or for liquid fluids (L) to descend (percolate). In addition, returns of liquid fluids (L) (such as leachates for example) are sometimes observed, especially in landfill, particularly by capillarity inside aggregates (S). The barrier layer (5) is therefore arranged to block these fluids (G, L) in their path through the aggregates (S). It is noted that the various layers used in the invention are intended to be used substantially horizontally, that is, deposited flat on, and/or in, the aggregates (S) and that in the present description the terms of <<on>>, <<under>>, <<above>> and <<beneath>> are used relative to the earth reference frame as the invention is defined relative to the depth and surface of the soils (or aggregates in general). Under the barrier layer (5) perforated mini-drains (23) and at least one through layer (22) which has permeability adapted to the passage of fluid (G, L) are arranged. This layer is so-called through layer as it is arranged to let through (gaseous and/or liquid) fluid(s) which pass through the aggregates (rising or descending). This through layer (22) could be provided to be draining or be filtering, that is, have permeability adapted to let particles of variables sizes pass through or not. Preferably, the through layer (22) will be arranged beneath the minidrains (23) and the barrier layer (5) will be arranged above the mini-drains (23), for example as illustrated in FIG. 4B. In some embodiments, the geocomposite (2) can comprise at least one second through layer (25), arranged to the other side of the perforated mini-drains (23) relative to the first through layer (22). Therefore, there will preferably be a first through layer (22) arranged beneath the mini-drains and a second through layer (25) arranged above the mini-drains and beneath the barrier layer (5), for example as shown in FIGS. 3A and 4A. The barrier layer (5) is arranged to form a barrier retaining fluids. This layer will be preferably made of material substantially impermeable to gases and/or to liquids. It is noted that this barrier layer (5) is not necessary perfectly impermeable but must at least provide a permeability contrast with the other elements and aggregates. In fact, for the through layer (22) to fully play its fluid drainage and collection role, such as detailed in the present application, it is necessary for it to have better permeability to fluid than the barrier layer (5) and than the support (especially the aggregates) on which it is arranged. This means <<substantially watertight>> and <<substantially impermeable>> as impermeability or perfect sealing is not necessary, as long as the permeabilities are adapted so that the fluid preferably borrows the discharge path via the mini-drains (23). Therefore, a membrane, a film, a synthetic layer or a textile less permeable than the through layer (22) could be provided for the barrier layer (5). However, as the fluids to be recovered are often gases, especially polluting gases, a completely impermeable membrane will generally be preferred. This membrane could for example be a HDPE membrane (high-density polyethylene) to guarantee good solidity and proper sealing. Therefore in the present application the term <<barrier layer (5)>> means these different possibilities, whether effectively a membrane or not (textiles or other, or even sediments) and the impermeability is relative (<<substantially>>) or total (<<completely>>). The barrier layer (5) is preferably a synthetic layer and the through layer or layers (22, 25) is or are preferably one of the textile layers. The permeabilities of the textile (22, 25) and synthetic (5) layers are adapted so that fluids (G, L) preferably borrow the discharge path via the mini-drains (23).

Figure 5A:
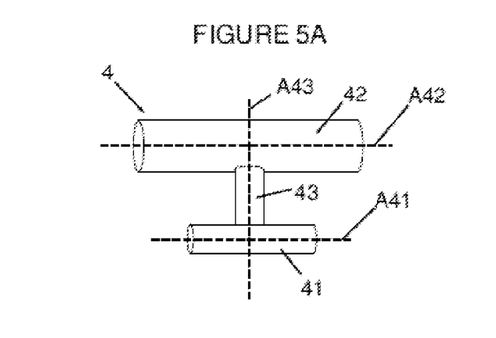
FIGS. 5A and 5B illustrate plan views of some embodiments of a connector, respectively alone and connected to a discharge pipe and a mini-drain.
Figure 5B:
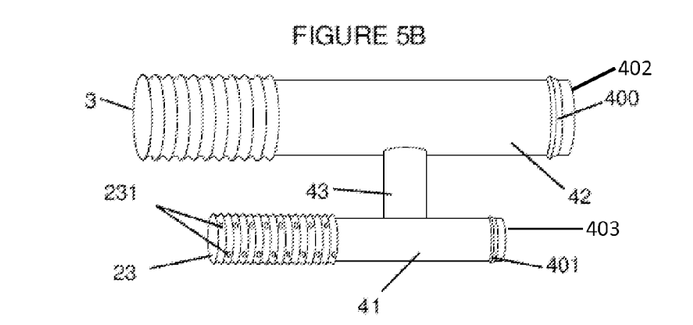

In a non-limiting manner, mini-drains (23) are preferably parallel to each other and at distances selected as a function of the destination of the geocomposite (2). For example, they can be distributed such that they are spaced apart by a distance ranging from 0.2 meter to 4 meters in width of the geocomposite (2), preferably between 0.5 and 2 meters, ideally of the order of a meter. Preferably, these mini-drains are ringed and have perforations 20 alternating at approximately 90°. Preferably, each narrow section of the grooves of a mini-drain (23) is fitted with two diametrically opposed perforations (231) and the perforations (231) of two successive narrow sections are offset to each other by 90°, for example as evident in FIG. 5B. In some embodiments, the perforated mini-drains (23) have perforations (231) which, instead of being rounded are oval or oblong to limit resistance to the entry of fluid and to limit clogging of the perforations (231, FIG. 5B). By way of illustration and non-limiting, these perforations could have a size of the order of 0.5 millimeter to 2 millimeters, preferably from 0.7 to 1.5 mm, ideally of the order of a millimeter. In addition, in some embodiments the mini-drains are ringed, for example as illustrated in FIG. 5B, to provide better resistance to pressure, which allows to be buried under a considerable quantity of aggregates. In some embodiments, these grooves also make connecting the mini-drains with connectors (4) easier, as described in the present application. The aim of the mini-drains (23) is to intercept fluid(s) (G, L) for drainage and recovery/discharge. They are generally, illustratively and non-limiting, resistant to pressures of up to 750 kPa which corresponds to around environ 60 m in height of aggregates (S) on average above the minidrain. The mini-drains (23) are resistant to compression, which allows fluids to always be discharged, even when the geocomposite (2) is buried under aggregates (in soil, for example). According to various embodiments, in a non-limiting manner, for there to be optimization of the fluid flow the minidrains (23) can have diameters of between 5 mm and 50 mm, preferably between 10 mm and 25 mm, ideally of the order of 25 mm. The diameter of the mini-drains must not exceed a certain value for a given composition and arrangement of mini-drains, such that they resist the weight of aggregates (S), as mentioned hereinabove.

In some embodiments, said geocomposite (2) also comprises at least one filtering layer covering the perforated mini-drains (23), so as to filter fluid, especially liquid fluids (L). Therefore, in some embodiments, the mini-drains (23) are enclosed by several layers of different layers, above and/or beneath the mini-drains. The aim of filtering layers is to protect the through layers from clogging by fine particles. Such layers consequently have porometry adapted to this function, as does the through layer with porometry adapted to its function. The filtering layer is preferably arranged to filter fluid and calibrate particles which penetrate the geocomposite while draining is preferably arranged to facilitate circulation of fluid in the geocomposite. These two layers will therefore have different openings, adapted respectively to their function. It is noted that this about <<layer>> which is a classic term for a geotextile, corresponding in general to tangling of needled threads which can also be designated by the term <<felt>>, but it is possible to use other types of coatings, preferably geotextiles, such as for example textiles which are woven or not, knitted or not, etc. This term <<layer>> conventionally designating a type of textile must therefore be interpreted less limitingly in the present application as types of coating other than the layers of geotextiles can be used, even though the latter are particularly adapted to the present invention. In fact, the tanglings of needled threads generally provide permeabilities particularly adapted to the present invention but for adapting the recovery of fluid(s) (L, G) to nature of the latter, it is possible to use other types of coating or even combinations of these layers of geotextiles with other coatings. As the barrier layer (5) is preferably substantially impermeable or watertight, a synthetic material is preferred, or even optionally a membrane or a film rather than a true layer. The through layer (22) is preferably non-woven. The technique of needle-bonding is preferred in the invention as it is easy to carry out and allows varied arrangements, examples of which are described in the present application. For example, during needle-bonding of the layers, spaces can be provided for the mini-drains (23). These mini-drains (23) are consequently linked to the structure of the geocomposite (2) since they are already in place between the layers when they are needle-bonded. The inter-layer bond made by needle-bonding imparts several qualities to the geocomposite (2). In fact, this bonding mode of layers offers a geocomposite having resistance to internal shear forces. This resistance is such that the geocomposite (2) can be used for drainage of steep banks. The bond by needle-bonding also offers a geocomposite (2) having uniform and constant porometry. A geocomposite (2) whereof the bonds are made by needle-bonding has increased solidity to laying and during use as stresses apply to the whole mass and not to a few precise points of the structure. Finally, filtering and/or draining qualities of the geocomposite (2) are not altered as is the case with bond via adhesion or sewing. In general and preferably, the layers (22, 25, 5), and the mini-drains (23), are constituted by non-putrescible materials such as for example polypropylene and are resistant to acidic or basic medium.

Often, especially in the field of waste storage, it is necessary to recover fluid(s) produced by this waste or that produced after aspersion of waste by at least one fluid which can be water and/or a solvent and/or an acid, for example. It is noted that the term <<fluid>> is used in the present application in the same way that this fluid has been added to aggregates (S) or produced by the latter. Liquid fluids which percolate for example at the bottom of crates in which waste is stored must generally be recovered by a discharge system so that it does not penetrate the ground in which the waste is buried. Yet, fluid originating from waste is loaded with bacteriological and fungicidal particles which, in the long term, can clog the geocomposite (2). The consequence of this is stopping of the passage of the fluid and the geocomposite (2) being made ineffective. In some embodiments, in order to eliminate this problem, the layers can be composed of fibres which have been extruded with at least one active antibacterial and/or bactericidal and/or fungicidal ingredient. This active ingredient can be embedded in the fibres so as to be present on the surface of the fibres and inside the fibres. This distribution allows in the medium and long term migration of antibacterial and/or bactericidal and/or fungicidal agents to the surface of the fibres, making the product effective in the long term. The layers are preferably composed of fibres of substantial diameter. This diameter corresponds for example to titration of fibres or a mass per unit of threads of between 4 dtex (or <<dtx>>, abbreviation of decitex) and 110 dtex given that 1 dtex corresponds to 1 mg of matter comprising fibres for 1 m of fibre. This allows a large filtration opening and a velocity component of permeability normal to the plane of the geocomposite (2) which is big enough to reduce the duration of contact between the geocomposite (2) and the fluid so as to limit the risks of clogging due to bacteria or fungi.

Figure 1:
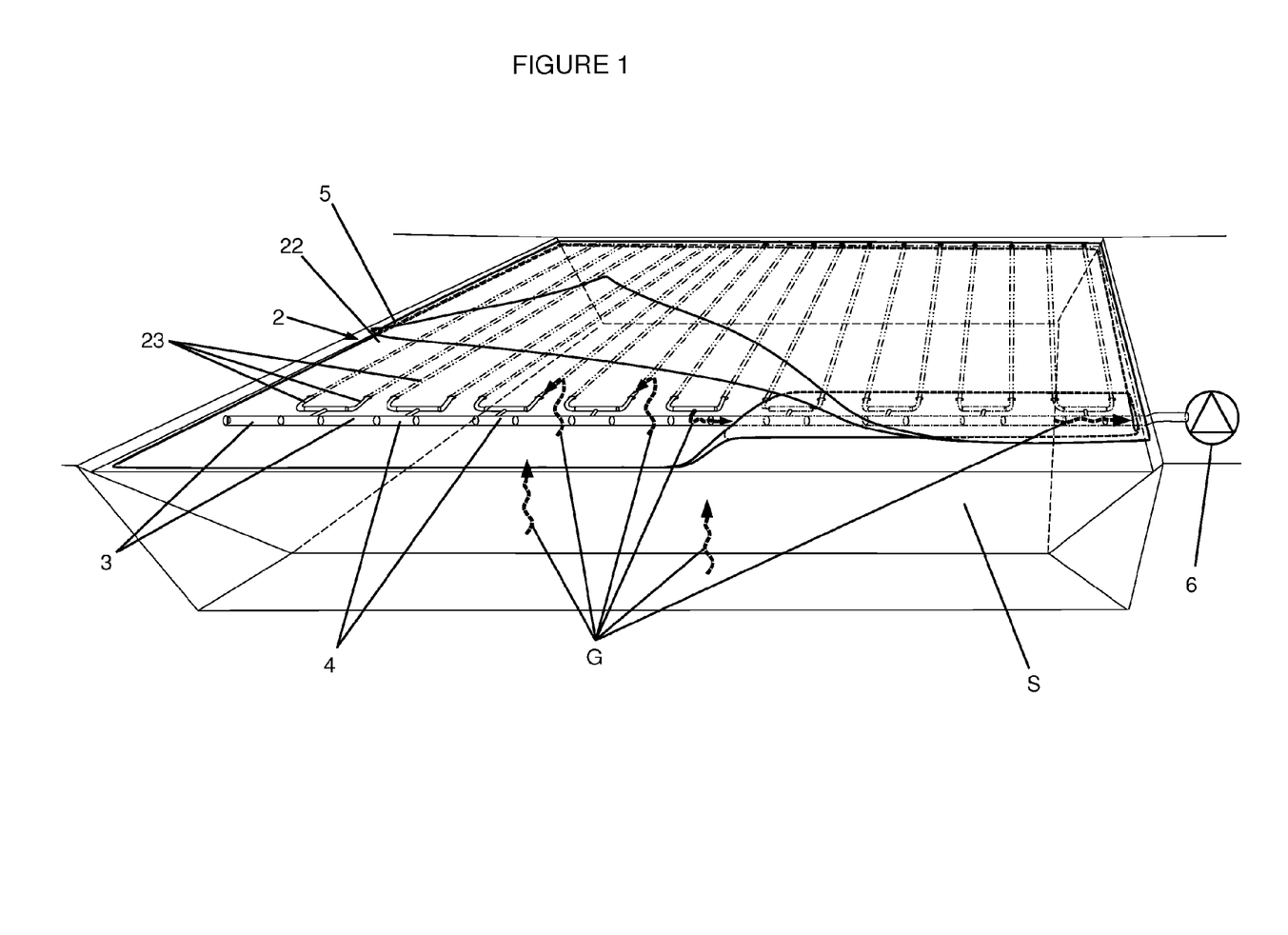
FIG. 1 illustrates a perspective view of a system according to some embodiments of the invention.
Figure 2:
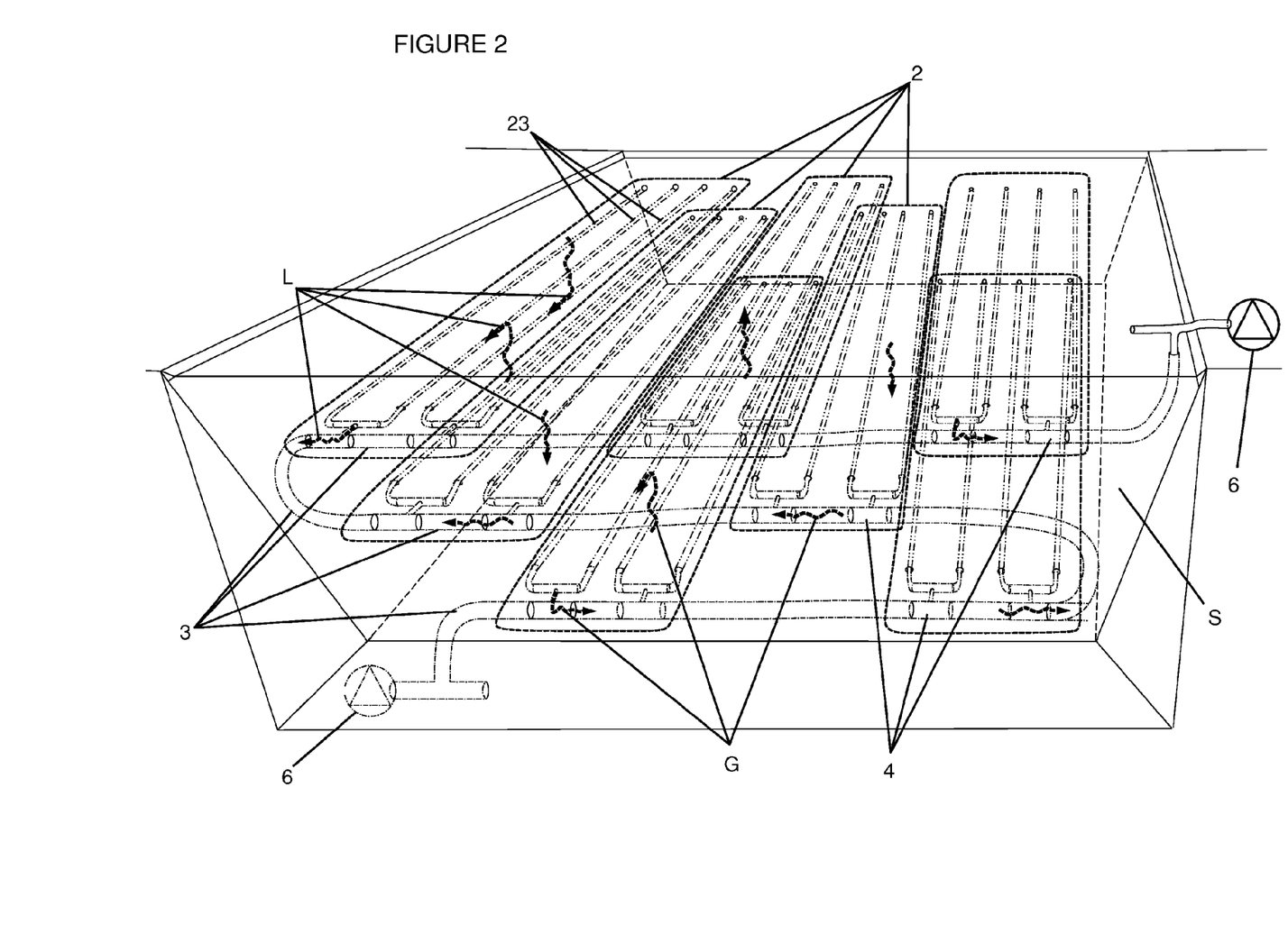
FIG. 2 illustrates a perspective view of a system according to some embodiments of the invention, FIGS. 3A and 3B each illustrating a sectional view on one part of a system according to some embodiments of the invention, FIGS. 4A and 4B each illustrating a sectional view on one part of a system according to some embodiments of the invention.

The layers (22, 25, 5) are generally arranged substantially horizontally in and/or on the aggregates in which the fluids must be recovered. The term <<substantially>> is used in the present description to signify <<approximately>>. In fact, for example, for the horizontal arrangement it is understood that it is on the one hand difficult to obtain perfectly horizontal disposition in rubble and on the other hand in fact to provide a slight slope, for example for flow in the direction of pumping to facilitate the latter. Therefore, in some embodiments, the layers (22, 25, 5) are used in the form of a cover substantially covering the entire surface of the aggregates (S), for example as illustrated in FIG. 1. In some embodiments, the layers (22, 25, 5) are used in the form of strips distributed inside the aggregates (S), for example as illustrated in FIG. 2. In some embodiments, the layers are used both in the form of strips distributed in the depth of the aggregates and in the form of a surface cover. In some embodiments, especially when the barrier layer (5) is needle-bonded onto the through layer (22) and lets some fluid through, instead of using only strips, these layers can be used optionally in the form of a cover buried beneath the surface of the aggregates, over the entire area to be treated (i.e., the zone of aggregates in which fluids are to be recovered), also optionally with a layer or surface layers. Similarly, it is possible, especially when the zone to be treated has dimensions excessive for proper recovery by a geocomposite in one contiguous area, to use a plurality of strips or cuts (of various forms and dimensions) at the surface of the aggregates. The geocomposite (2) is generally placed on the surface of the aggregates (S) whence gaseous fluids rise. This aggregate surface could in fact be deep in the ground (at the bottom of a pond, for example) or in the soil. In fact, for example in the case of a retention pond, the aim can be to recover gas from soils located under the pond. The invention could therefore be placed under the pond, according to the various embodiments described here. In the case of strips distributed in the depth of the aggregates, a choice could be made for example from strips of around 4 meters in width forming the entire length of the zone to be treated. Such strips could all be distributed for example every 10 or 20 meters in width and every 5 or 6 meters in height. These values are given here only by way of illustration and are not limiting, as it is possible to adapt the width and the length of the strips, as well as their distribution in width, length and depth in the zone to be treated. It is understood from these illustrative and non-limiting figures that FIG. 2 is only a schematic representation in which mini-drains are illustrated with a reduced number and exaggerated size for reasons of clarity. Similarly, and for the same reasons, the number of strips of geocomposite (2) illustrated is only illustrative and the notions of relative dimensions are not respected in FIG. 2. It is noted that for ease of illustration and for reasons of clarity, the geocomposite (2) of FIG. 2 shows only one layer and mini-drains, but it will be understood from the present description that the various embodiments described can be provided, with the barrier layer (5) integrated for example. The skilled person understands from the present description that the term <<strip>> here in fact means a piece of any shape and that it is not necessary for this to be a substantially rectangular strip which the term <<strip>> designates in general. It is noted that FIG. 2 illustrates a particular advantageous feature of some embodiments. In fact, in these embodiments, the geocomposite strips buried in successive layers within aggregates are arranged such that the edges of a strip in a given layer are at the vertical to the edges of another strip of another layer. Therefore, there is overlaying between at least one part of the strips of a layer with the strips of the other layers, such that the fluid passing through the aggregates (substantially vertically but often according to a random path) has maximum chance of encountering at least one strip, or even a plurality of strips along its path (when rising or descending). In addition, in the embodiments with buried strips, such as illustrated in FIG. 2 for example, the geocomposite used for the strips preferably comprises a barrier layer integrated by needle-bonding on the through layer, by needle-bonding except at the level of the mini-drains. It is understood from the present application that in some embodiments a succession of strips results which all the same lets fluid(s) through, except at the level of the mini-drains and which allows fluid recovery distributed within aggregates along the path of the fluid or fluids encountering the successive strips of geocomposite. On the other hand, some embodiments provide that in addition to these buried strips with needle-bonded barrier layer, at the surface there is at least one impermeable membrane (or at least having permeability adapted to offer effective fluid blockage). Therefore, the fluid is recovered due to the successive layers of strips of geocomposite with needle-bonded barrier layers on the through layer, except at the level of mini-drains, for executing effective and distributed pumping in the aggregates and passage of fluid can be blocked at the surface to optimise treatment of aggregates.

Figure 3B:
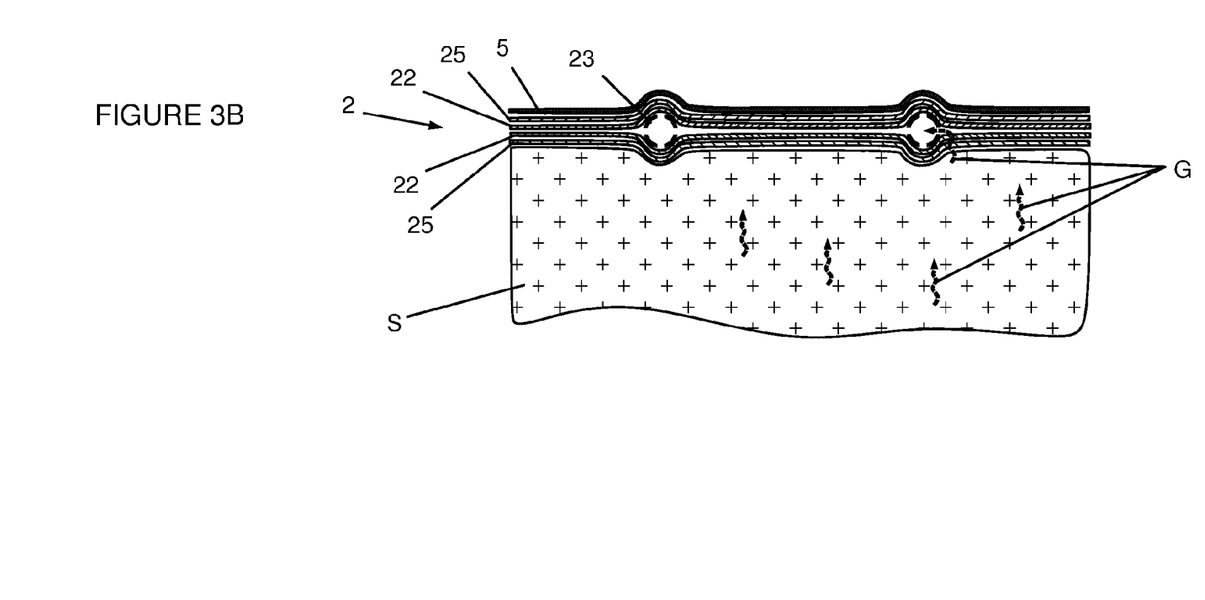

FIG. 1 illustrates an illustrative example of embodiments where the barrier layer (5) is separate from the through layer (22). FIG. 1 outlines the placing of the system in these embodiments, with the barrier layer partially folded back on itself, in the method of being unrolled underneath the through layer (22) which is in the method of being folded back on itself to cover the connectors (4) and the discharge pipes (3). In the area to the left it is clear that the mini-drains (23) emerge from the geocomposite (2) via openings made in the through layer (22) to be connected by means of connectors (4) to the discharge pipes (3) connected, at one end (to the right in FIG. 1) of the line formed by these pipes (3), to a pumping device (6). The other end of the line formed by the pipes (3) is, in some cases, closed by a stopper (as illustrated at the left in FIG. 1 for, example). It could be however that all the ends of the pipes are connected to pumping devices (6). Folding the through layer (22) back onto the connectors and the mini-drains as illustrated in the right part of FIG. 1 protects the latter and forms a compartment where the fluid is drained by the layer until it is aspirated in the connectors (4). It is noted that FIG. 1 illustrates the opening of the through layer (22) for connection of the mini-drains, but that in the event where the geocomposite comprises just one through layer the latter can be arranged beneath the mini-drains and does not need such an opening. Similarly, it is possible to provide a geocomposite (2) comprising a first lower through layer (22) beneath the mini-drains (23) and a second upper through layer (25) above the drains, with at least one layer (preferably the upper) shorter than the other and whereof the mini-drains (23) are shorter than the longest layer (preferably lower) and longer than the shortest layer (preferably upper). Therefore, the longest lower layer (22) can be folded back on the connectors without its having to be opened. Similarly, layers of the same length associated with mini-drains longer than the layers can also be provided for ease of connection of the mini-drains without having to open a layer and without any folding back being needed. In the case of a dual-layer geocomposite, a section of the type of that illustrated in FIG. 3A is obtained in transversal cross-section, and at the level of the folding back formed above the portion where the mini-drains emerge from the geocomposite, a section of the type of that illustrated in FIG. 3B, with the two layers doubled above and beneath the mini-drains (23). FIG. 4A illustrates a geocomposite with double through layers, as in FIG. 3A, but buried in the aggregates, whereas FIG. 4B illustrates a geocomposite with a single through layer, also buried in the aggregates. The skilled person will clearly deduce the sections resulting from the folding back of the various variants explained in the present application. The fluids (G, L) are illustrated in the figures of the present application by undulating dotted arrows. FIGS. 4A and 4B illustrate liquid fluids (L) in addition to gaseous fluids (G) and these various types of fluids could reach the interior of the mini-drains (23) via the perforations (231) of the latter.

The invention can be carried out at the surface of aggregates, such as for example at the surface of the soil, as illustrated in FIG. 1 for example or at depth. In some embodiments, especially in the case of buried landfill, the invention is implemented in a pond, as in the example illustrated in FIG. 2. It is noted that the system of FIG. 1 can be employed at the surface of the aggregates on the system of FIG. 2, as mentioned previously. In addition, it is evident that the present application mentions the use of at least one geocomposite and that several geocomposites (2) can in fact be used. In embodiments in which one or more geocomposites are used, a given geocomposite either has no barrier layer (5) or integrates the barrier layer (5).

The system according to the invention on the other hand uses connectors (4) arranged to connect the perforated mini-drains (23) to discharge pipes (3) connected to at least one pumping device (6), such that at least one fluid (G, L) present in the aggregates (S) can reach the interior of the perforated mini-drains (23) and be discharged to the pumping device (6). It is understood from the various embodiments described in the foregoing that the invention relates to a system comprising through (22, 25) and barrier (5) layers, perforated mini-drains (23) and connectors (4) connected via the discharge pipes (3) to the pumping device, but that it also relates to the geocomposite (2) comprising the through (22, 25) and barrier (5) layer or layer(s) with the perforated mini-drains (23). On the other hand, the invention also relates to a connector (4) as detailed in the present application.

The geocomposite (2) according to the invention can integrate or not the barrier layer (5). Preferably, this barrier layer is integrated and the geocomposite (2) for fluid recovery in aggregates (S) comprises on the one hand at least one layer, a so-called through layer (22), having permeability adapted to the passage of fluid (G, L) and fitted with perforated mini-drains (23) and, on the other hand, at least one layer, a so-called barrier layer (5), having permeability adapted to the blockage of fluid (G, L). The barrier layer is preferably needle-bonded on the through layer (22) except at the level of the mini-drains (23), such that the barrier layer (5) forms a barrier to the passage of fluids (G, L) only at the level of the mini-drains (23). In other embodiments, which have the advantage of being more watertight and therefore more practical in some applications, the barrier layer is fixed by adhesion or any other technique preventing it from being perforated. Yet, a barrier layer letting through at least some of the fluid or fluids (liquid and/or gaseous) is generally preferred, as it especially prevents the formation of retention pockets. Therefore, providing a barrier layer which lets fluid or fluids through at least partially produces effective recovery as the accumulation of fluid is avoided and recovery occurs progressively, for example in the successive layers of geocomposite comprised in the system. In particular, a barrier layer is preferably used which forms a barrier completely impermeable to passage of fluid only at the level of mini-drains where fluid recovery can occur, while the rest of the barrier layer lets fluid(s) passing through it more or less. It is understood therefore that the invention multiplies the recovery geocomposite, buried within the aggregates and/or at the surface of the aggregates (or as a complement of an impermeable membrane at the surface) producing progressive and relatively homogeneous recovery of fluid, particularly effectively without the need for other devices such as watertight envelopes about the aggregates or particularly powerful pumping means for aspirating the pockets which would form if totally watertight membranes only were provided.

In some embodiments, the connector (4) comprises at least one recovery conduit (41) arranged to be connected to at least one perforated mini-drain (23) and at least one collection conduit (42) arranged to be connected to at least one discharge pipe (3), the interior of the recovery conduit (41) being in communication with the interior of the collection conduit (42). Such a connector can be used in various types of fluid recovery systems. In particular, some embodiments of the connector are particularly advantageous for various types of fluid recovery systems. The invention therefore also relates to a connector (4) for fluid recovery in aggregates (S), comprising on the one hand at least one recovery conduit (41) arranged to be connected to at least one perforated mini-drain (23) of at least one geocomposite (2) comprising at least one layer (22, 25, 5) and perforated mini-drains (23) and, on the other hand, at least one collection conduit (42) arranged to be connected to at least one discharge pipe (3) connected to at least one pumping device (6), the interior of the recovery conduit (41) being in communication with the interior of the collection conduit (42), such that fluid present in the aggregate (S) and reaching the interior of the mini-drains (23) is discharged to the pumping device (6).

Figure 6A:
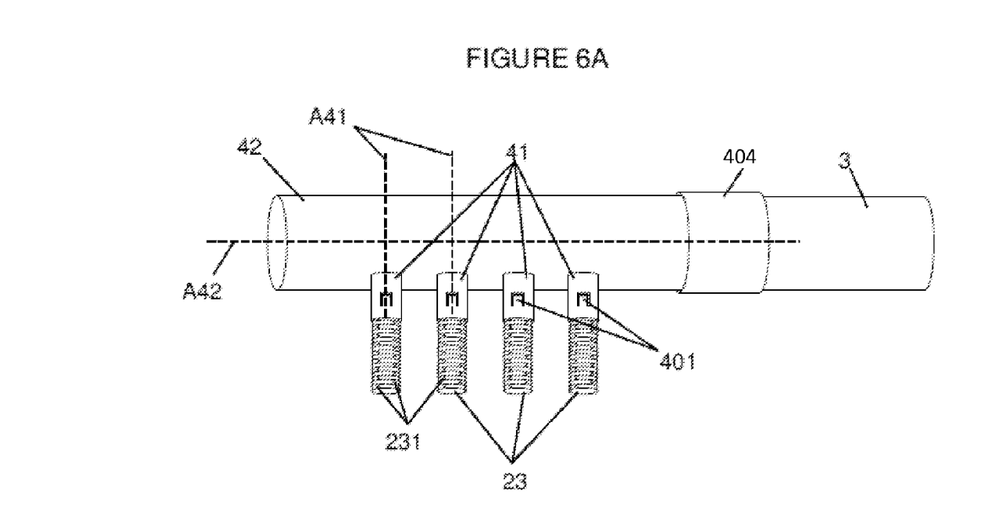
FIG. 6A illustrates a plan view of some embodiments of a connector, connected to mini-drains and a discharge pipe.

In some embodiments, the recovery conduit (41) has form and dimensions adapted to those of the perforated mini-drains (23) and the collection conduit (42) has form and dimensions adapted to those of the discharge pipes (3), such that the connector (4) is arranged on a connection via nesting with the mini-drains (23) and the discharge pipes (3). In some embodiments, at least one conduit (41, 42) of the connector comprises fastening means (401) of the mini-drains (23) and/or fastening means (400) of the discharge pipes (3). For example, the mini-drains can be ringed as mentioned previously and illustrated in FIG. 5B. The recovery conduit (41) could also comprise grooves or at least one projection (403, FIG. 5B) (a notch, a boss, etc.) complementary to the grooves of the mini-drains to enable nesting and reversible fastening of the mini-drains. Similarly, the discharge pipe (3) can also comprise grooves, and the collection conduit (42) could comprise at least one projection (402, FIG. 5B) (a notch, a boss, etc.) complementary for nesting, as illustrated for example in FIG. 5B. The advantage provided by nesting is easier handling and execution of the system such that an operator loses the least time possible in connecting the mini-drains (23) to the pipes (3). Complementarity of forms to allow at least relative sealing of the connection will preferably be selected such that aspiration produced by the pumping device does not experience too many losses in the system. Nesting of the connector in or about the mini-drains and pipes could be selected interchangeably. For example, in some embodiments whereof an example is illustrated in FIG. 6A, the connector (4) is arranged so that the mini-drains are nested in the recovery conduit (41). In addition, this example illustrates fastening means (401) for locking the mini-drains in the recovery conduit (41). These fastening means (401) can comprise at least one flexible foot, for example cut into in the conduit and comprising a projection arranged to engage in a groove of the mini-drains, as particularly evident in FIGS. 6B and 6C for example. Such fastening means have the advantage of being easy and rapid to use since it suffices to snap-lock the mini-drains (23) into the connector (4). In addition, in some embodiments, these fastening means (401) are reversible, as for example in those of FIGS. 6A, 6B and 6C. In fact, in these examples, the flexible foot is accessible from the exterior of the recovery conduit (41) because of a cutout in the latter for lifting the foot with a tool or a fingernail for example, to pull out the mini-drain (23). On the other hand, one described here fastening means (400, 401) as being include in the connector, it is possible that they are in fact formed by a separate element, such as for example a sleeve, male or female, for example such as the female sleeve (404) illustrated in FIG. 6A. Such a sleeve could comprise fastening means, especially reversible, such as bosses, projections or feet, for blockage (locking) of the mini-drains or pipes.

Figure 5C:
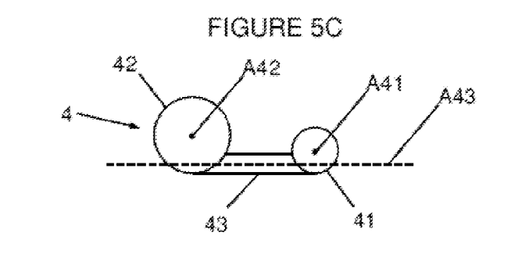
FIGS. 5C, 5E and 5F illustrate profile views of various embodiments of connectors.
Figure 5D:
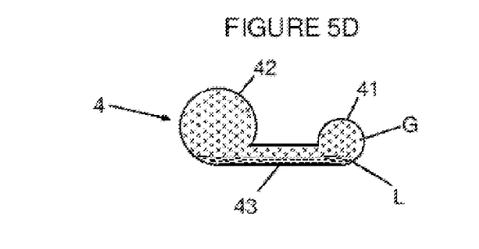
FIG. 5D illustrates a sectional view of an embodiment of a connector, transversally to the longitudinal axis of at least one of the conduits of this connector.

In some embodiments, the interior of the recovery conduit (41) is in communication with the interior of the collection conduit (42) by means of at least one connection conduit (43) whereof the internal walls terminate on the internal walls of the recovery conduit (41) and of the collection conduit (42). As particularly visible in the illustrative example of FIG. 5D, showing a transversal cross-section of the connector, the connection conduit terminates inside the two other conduits of the connector. The conduits are illustrated here with a circular cross-section which is a preferred form for the conduits but it is clear that the invention is not limited to this embodiment as polygonal cross-sections are feasible.

Figure 5E:
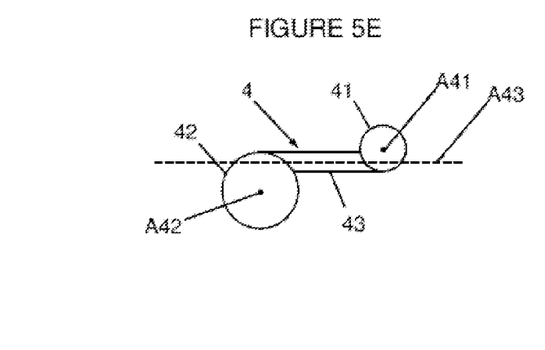
Figure 5F:
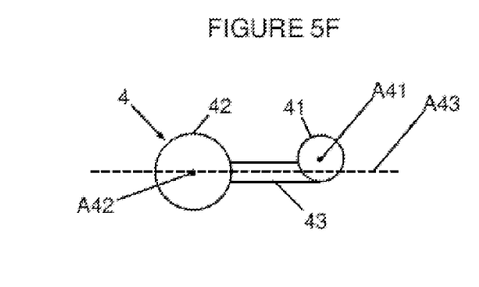

In some embodiments, the conduits (41, 42, 43) of the connector are each oriented according to at least one respective longitudinal axis (A41, A42, A43) and the connection conduit (43) is arranged so that its longitudinal axis (A43) is non parallel to the axes (A41, A42) of the other conduits (41, 42) and crosses the transversal cross-section of at least one of these other conduits (41, 42) near the periphery of this transversal cross-section. As is particularly visible in the illustrative example of FIG. 5D, the connection conduit (43) is substantially tangential to the circular periphery of the two other conduits. The connector (4) can be arranged so that only part of the internal wall of the connection conduit (43) is substantially tangential to the periphery of the section of at least one of the recovery (41) and/or collection (42) conduits, the cross-section being taken transversally to the longitudinal axis of the recovery conduit (41) and/or of the collection conduit. Therefore, this disposition of the connection conduit (43) makes recovery of at least one fluid liquid (L) by the system easy. In fact, if the connector is placed with the connection conduit (43) oriented downwards, that is, in the direction of the aggregates (S) from where the gaseous fluid (G) rises, this connection conduit (43) communicates with the lowest point of the cross-section of the recovery conduit (41) and/or of the collection conduit (42). Preferably, the connection conduit (43) is substantially tangential at least to the recovery conduit (41), as visible on the variant of FIGS. 5C and 5D but also the variants of FIGS. 5E and 5F, as it is in this recovery conduit (41) where the liquids coming from the mini-drains (23) will be recovered. It is therefore important that liquids are discharged towards the collection conduit (42). The connection conduit (43) can have its axis arranged near the centre or a tangent to the section of the collection conduit, as illustrated respectively in the variant of FIG. 5F and in the variant of FIG. 5E. If it is near a tangent to the collection conduit, the axis of the collection conduit can be above the axis of the connection conduit, but the axis of the collection conduit can also be beneath the axis of the connection conduit. In the latter case, an added advantage is obtained as the liquid conveyed towards the collection conduit cannot return to the connection conduit and the recovery conduit via simple flow. However, this advantage requires the collection conduit to be driven into the aggregate on which the connector is set. It is noted that the different variants described here for advantageous positioning relative to the recovery conduit (41) are described in detail for the case of a connection conduit (43), but that substantially the same disposition could be provided in the absence of such a connection conduit (43). There could be a recovery conduit (41) substantially tangential to the collection conduit (42) and the effort would be made to ram the latter into the ground such that the liquid in the recovery conduit (41) flows in the collection conduit (42). In fact, the connector substantially in the form of an H is illustrated here as this is a preferred form, with the two large branches of the H formed by the recovery conduit and the collection conduit, the small transversal branch being formed by the connection conduit. However, a connection conduit can be dispensed with and a X form, K or even a Y form if could for example be provided if the aim is to connect a different number of mini-drains and pipes. In these various arrangements, it could be provided that the recovery conduit(s) terminate near the periphery of the transversal cross-section of the collection conduit or conduit(s), to produce the same effect of making recovery of liquid fluids easier. The skilled person will understand the possible variations from these various examples which are in his reach, but will understand that the H form is particularly advantageous in terms of handling as connection is made easier by the distance which separates the various ends of the connector. Also, the fact that the recovery and collection conduits are substantially parallel to each other has the advantage of making handling and disposition of mini-drains and pipes in the system easier. In addition, these two advantages are further improved by the presence of a connection conduit which distances the open ends of the connector and makes handling easier.

Figure 6B:
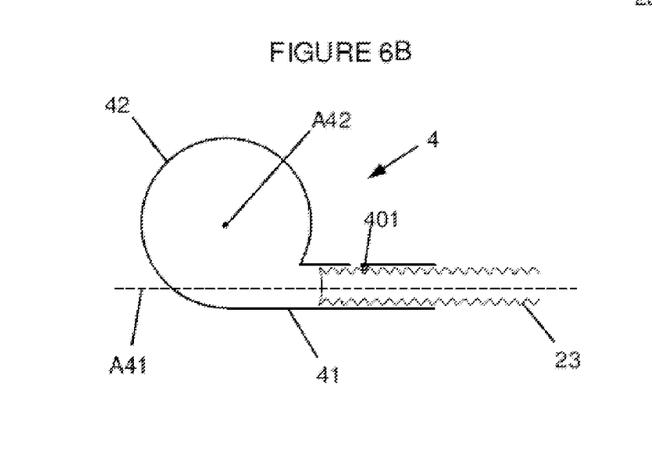
FIGS. 6B and 6C illustrate variants of these embodiments, by sectional views transversal to the longitudinal axis of this connector.
Figure 6C:
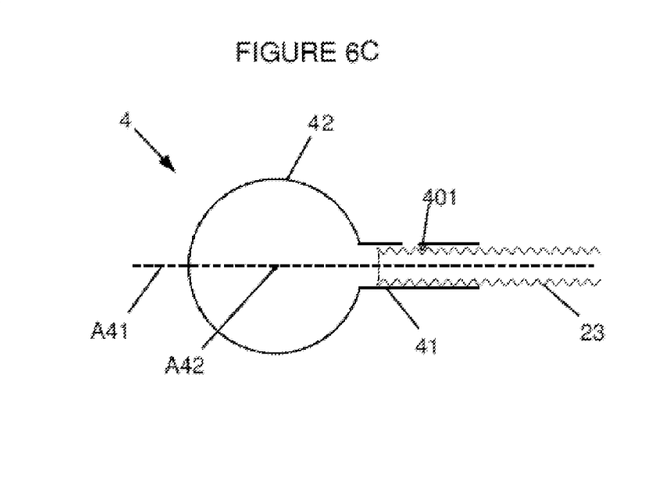

On the other hand, in some embodiments the connector can also have no connection conduit (43), which especially has the advantage of greater compactness. For example, the connector can be arranged with a collection conduit (42) in which recovery conduits (41) terminate directly. Some particularly advantageous embodiments of this type of connector are illustrated in FIGS. 6A to 6C. In these embodiments, the longitudinal axes (A41) of the recovery conduits (41) are non parallel to the axis (A42) of the collection conduit (42), and preferably substantially perpendicular to the latter, such as for example illustrated in FIG. 6A. This orientation of the recovery conduits (41) has the advantage of making connecting the mini-drains easier. In fact, it is evident from the present description that the mini-drains are preferably parallel to each other and that the recovery pipes (3) preferably run substantially perpendicularly to the axis of the mini-drains. This therefore results in a connector easy and rapid to use as there is no need to bend the mini-drains to connect them. In addition, it is clear that this type of embodiment multiplies the number of mini-drains connectable to the same connector. For example, in FIG. 6A the connector comprises 4 recovery conduits (41). This number can be increased, of course if needed. In addition, it becomes possible to have a single type of connector (4) usable for various types of geocomposite whereof the distribution of mini-drains is different. For example, the recovery conduits (41) can be equipped with a stopper or can be blocked with a removable pin and can be present in large numbers such that a maximum of mini-drains can be connected if the geocomposite includes many of them or the mini-drains can be connected only to some of the recovery conduits (41) if the geocomposite comprises fewer. Just a single type of connector is used if the geocomposite comprises many mini-drains or fewer. It will be evident that the considerations disclosed hereinabove as relates to the axes of the conduits, and especially the axis (A43) of the connection conduit relative to the cross-section of the collection conduit (42), are also valid as relates to the axis (A41) of the recovery conduits (41) relative to the cross-section of the collection conduit (42), especially in embodiments with no connection conduit (43). Therefore, for example, the recovery conduit (41) can have its axis (A41) arranged near the centre or at a tangent to the section of the collection conduit (42), as illustrated respectively in the variant of FIG. 6B and in the variant of FIG. 6A. In these two variants, it is clear that the connector is adapted to fluid recovery. In the case of FIG. 6B, it suffices to lay the connector (4) flat so that the liquid can flow out, the reflux to the recovery conduit (41) being limited by the aspiration in the collection conduit (42). In the case of FIG. 6C, it is preferable to ram the collection conduit (42) into the aggregates so that the liquid can flow out, the reflux to the recovery conduit (41) being prevented by the fact that the recovery conduit (41) is at a higher level than the lowest part of the collection conduit (42). It is also clear that in the various embodiments presented for the recovery of liquid, it is the fact that the lowest level of a conduit upstream is at the same level or at a higher level than the lowest level of a conduit downstream which allows fluid recovery. Therefore, the skilled person could provide various variants for the respective orientation and position of the axes of the respective conduits of the connector, by retaining this relation of the lowest levels inside the conduits, to produce easier flow.

With these various arrangements of the connector optimising the recovery of liquid, it is clear that the connector can be used elsewhere than in a fluid recovery system such as described in the present application and can be used in any type of fluid recovery system, especially recovery of liquid only, such as for example those described in French patent applications 10 60514, 09 03857 or 04 07701, deposited by the applicant of the present application. This type of connector has the advantage of being adapted to various types of fluid, especially in some embodiments where its conduits are arranged tangentially to each other (as described in detail in the present application), but also the advantage of being easy to use and put in place, in addition to low production costs.

As mentioned previously, the mini-drains are preferably parallel to each other in the geocomposite. Several mini-drains (23) can therefore be connected to a discharge pipe (3). Several ends of a pipe (3) could for example be connected between the successive connectors (4) which connect several mini-drains (23). For example, with the H form, two mini-drains are connected by a connector to two portions of a discharge pipe which can be extended as far as the following connector arranged at the level of the two following mini-drains of the geocomposite, and so on, as shown in FIGS. 1 and 2. The result is a set of discharge pipes which discharges fluid. It is clear however that the connector can be arranged to have more than 2 branches for connecting more than 2 mini-drains, whether this is a H connector or other, to a connection conduit, such as for example that of FIGS. 5A to 5F, or a connector without connection conduit, in Y or X or K form or such as for example that of FIGS. 6A to 6C. Different variant embodiments are possible and contemplated as a function of the number and distribution of mini-drains relative to discharge pipes. In FIG. 2, the stages formed by the strips distributed at various depths are illustrated connected by means of a connection pipe (3). For greater simplicity a circuit passing through the various stages is illustrated here, but it will be understood that it is possible to multiply the pipes, for example to have one pipe for each stage so that each stage is directly connected to the surface and aspiration is more effective. Various adaptations are possible as a function of the dimensions (width, length, depth of the zone to be treated). It will be evident that in the example of FIG. 2, at the bottom of the pond a second pumping device is illustrated provided for example for liquid fluids (L). This second pumping device could also be connected to a liquid recovery system arranged at the bottom, such as for example those described in French patent applications 10 60514, 09 03857 or 04 07701, filed by the applicant of the present application. Similarly, at the surface the pumping device (6) and the pipe (3) are illustrated with a connector which can receive another recovery pile (3), such as for example that which would come from a geocomposite placed at the surface (as in FIG. 1). The various possible combinations are therefore understood. It will be evident that the pumping device can terminate for example in a recycling device, outside the aggregates or not.

The invention provides a method for the recovery of fluids, especially for setting up a system according to various embodiments of the invention. The method can be carried out in a system according to the invention. The method could comprise at least one aspersion step (single or repeated as needed) of at least one type of liquid fluid on the aggregates deposited on the system, but this step is optional as the liquid fluid can be obtained from rainwater or, especially in the case of waste, be produced directly by the aggregates themselves. In addition, especially in the event where it relates to a pond in which there are successive layers of geocomposite, such as for example in buried landfills, the method can be preceded by steps for putting in place, especially at the bottom of the pond, a liquid recovery system such as leachates, especially with geocomposites. These steps could for example be relative to a liquid recovery method and/or a depollution method such as for example described in the French patent applications 10 60514, 09 03857 or 04 07701, filed by the applicant of the present application. The method could be also completed by a connection step of the discharge pipes (3) to a pumping device for recovering liquids, for example at the bottom of the pond.

Figure 7:
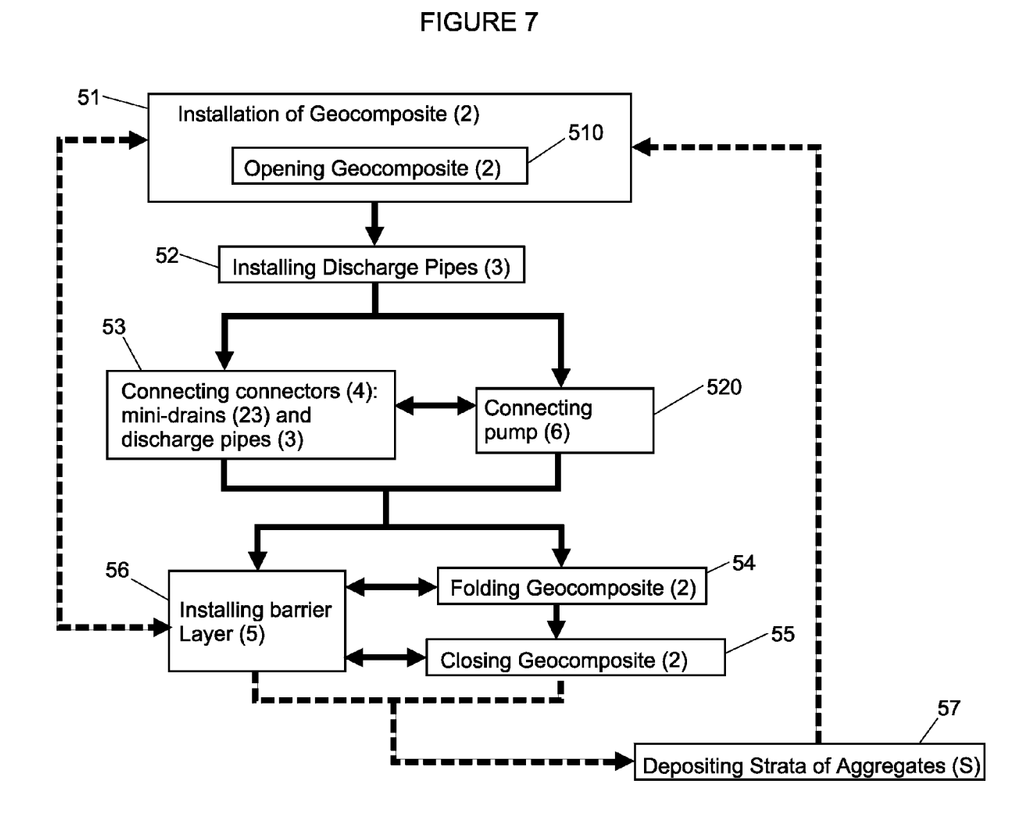
FIG. 7 illustrates the steps of a method according to some embodiments of the invention.

An embodiment of the method is illustrated schematically in FIG. 7, showing the majority of possible steps of the method, even some optional steps, especially those illustrated in dotted lines. The double arrows and the 30 dotted lines indicate possible alternatives in the succession of steps. The method for fluid recovery in aggregates (S) comprises a step for laying (51), in contact with the aggregates (S), of at least one geocomposite (2) such as described in the present application. This geocomposite comprises at least one layer, so-called through layer (22), and perforated mini-drains (23). The method also comprises a step for laying (52) discharge pipes (3) connected to at least one pumping device (6), a connection step (53) for perforated minidrains (23) to the discharge pipes (3) by means of adapted connectors (4), and a step for laying (56) at least one so-called barrier layer (5), such that at least one fluid (G, L) present in the aggregates (S) can reach the interior of the perforated mini-drains (23) and be discharged to the pumping device (6). The method could naturally comprise a connection step (520) of the pipe (3) to the pump (6).

In some embodiments, the steps for laying (51) the geocomposite and for laying (56) the barrier layer are executed simultaneously due to the fact that the barrier layer (5) is integrated into the geocomposite (2). This integration is preferably done by needle-bonding of the barrier layer onto the through layer as explained previously. This needle-bonding of the layers is conducted during manufacture of the geocomposite, which makes it easy to execute relative to laying a barrier layer on the through layer when the system with separate barrier and through layers is being laid. In fact, it is generally preferred that the two layers are interconnected to prevent sliding of one relative to the other and, as detailed hereinabove, it is preferred that the barrier layer forms a barrier only at the level of the mini-drains. It is therefore easier to link both layers by providing the holes of the barrier layer relative to the mini-drains during manufacture with layers rather than on-site where they are intended to be placed. In addition, the technique of the needle-bonding is particularly effective and practical for geocomposites but if it is planned to integrate (and pierce) the barrier layer on the through layer when the system is being laid, other techniques should generally be employed. Similarly according to the arrangement selected for the geocomposite, and especially its layers, the method could comprise an opening step (510) of the geocomposite (cutout) to bring out the mini-drains (23) from the through layer (22) or from one of the two layers (22, 25). As indicated previously, a geocomposite can be provided which does not need this step, for example with mini-drains which project beyond at least one layer. Laying (52) of the pipes (3) is preferably carried out on an edge of the geocomposite (2) and according to the type of geocomposite (2) used, the method could comprise a step for folding back (54) a geocomposite edge on the connectors, and a possible closing step (55) of the geocomposite by fastening of the latter on itself.

In some embodiments, the connection step (53) is obtained via nesting between a recovery conduit (41) of the connector (4) and perforated mini-drains, because of form and dimensions of the recovery conduit (41) adapted to those of the perforated mini-drains (23) and via nesting between a collection conduit (42) of the connector (4) and discharge pipes (3), because of form and dimensions of the collection conduit (42) adapted to those of the discharge pipes (3).

According to various embodiments, the steps of the method can be conducted for strips of geocomposite (2) and of barrier layer (5), distributed within the aggregates (S) because of the successive reiterations of the steps of the method during successive steps of depositing (57) of strata of aggregates (S). In addition, the steps of the method can be conducted at the surface of the aggregates (S) to cover the latter with a cover comprising the geocomposite (2) and the barrier layer (5).

In some embodiments, especially in the case of buried landfill, completing the steps of the method is preceded by use of a deposit step, on the surface of the aggregates (S) to be covered, of at least one layer of at least one type of sediment or aggregate to form a closing layer (or <<closing soil>>) under the geocomposite so as to protect the latter from the aggregates (S), especially any sharp objects in the waste.

Reference is made in the present application to French patent applications 10 60514, 09 03857 or 04 07701, filed by the same applicant. French patent application 04 07701 describes a geocomposite comprising a draining layer on which perforated ringed mini-drains are arranged parallel to each other, and at least one filtering layer covering the perforated ringed mini-drains, the draining layer and the filtering layers being joined together by the technique of needle-bonding. This type of geocomposite can be used in the recovery of liquid, as described in the present application for example. French patent application 09 03857 describes a geocomposite comprising at least one draining layer on which perforated ringed mini-drains are arranged parallel to each other and at least one filtering layer covering the perforated ringed mini-drains, the filtering layer being composed of fibres in which is embedded at least one antibacterial and/or bactericidal and/or fungicidal active ingredient. This type of geocomposite is particularly adapted to the recovery of liquid, in particular because of its anti-clogging properties, especially in buried landfill. French patent application 10 60514 describes as such a system for intercepting chemical compound in aggregates, characterised in that it comprises at least one surface on which at least one geocomposite is arranged comprising at least one draining layer on which perforated mini-drains are arranged each containing at least one fixer thread of chemical compound, aggregates (S) being deposited on said geocomposite such that it is a fluid which is loaded with chemical compound when passing through the aggregates, reaches the interior of said perforated mini-drains in which said fixer threads intercept the chemical compound(s). In particular, in some embodiments this system described in this application comprises at least one substantially impermeable membrane covering said surface. In addition, in some embodiments, the system comprises at least one collecting trench, arranged in and/or at the edge of said surface, and whereof the bottom is impermeable and located at a height less than that of said surface. In some embodiments, said trench terminates on at least one pumping device. The geocomposite and the system described in French patent application 10 60514 are therefore particularly adapted to the recovery of liquid and to depollution of this liquid and the present invention could be complemented by such a system.

The present application describes various technical characteristics and advantages in reference to the figures and/or to various embodiments. The skilled person will understand that the technical characteristics of a given embodiment can in fact be combined with characteristics of another embodiment unless the inverse is expressly mentioned or if it is evident that only these characteristics are incompatible. In addition, the technical characteristics described in a given embodiment can be isolated from the other characteristics of this mode unless the inverse is expressly mentioned.

It must be evident for skilled persons that the present invention allows embodiments in numerous other specific forms without departing from the field of application of the invention as claimed. Consequently, the present embodiments must be considered by way of illustration, but can be modified in the field defined by the scope of the attached claims, and the invention must not be limited to the details given hereinabove.

The invention claimed is:

1. A fluid recovery system, intended for fluid recovery in aggregates (S), the system comprising:
   a barrier layer having permeability adapted to the blockage of fluid (G, L) and beneath which is arranged a geocomposite (2) comprising perforated mini-drains (23) and a through layer having permeability adapted to the passage of fluid (G, L), said barrier layer (5) integrated with the geocomposite (2) by needle-bonding on the through layer (22) except at the level of the mini-drains (23), so as to form a barrier to the passage of fluids (G, L) only about the mini-drains (23); and
   connectors (4) connecting the perforated minidrains (23) to discharge pipes (3) connected to a pumping device (6), such that a fluid (G, L) present in the aggregates (S) can reach the interior of the perforated mini-drains (23) and be discharged to the pumping device (6).

2. The system as claimed in claim 1, wherein the system is arranged substantially horizontally and organized into at least one of a plurality of strips distributed inside the aggregates (S) or a cover substantially covering an entire surface of the aggregates (S).

3. The system as claimed in claim 1, wherein said geocomposite (2) comprises at least one second through layer (25) arranged to an opposite side of the perforated mini-drains (23) relative to the through layer (22).

4. The system as claimed in claim 1, wherein the permeabilities of the through (22, 25) and barrier (5) layers are adapted so that fluids (G, L) are directed to a discharge path via the mini-drains (23), the connectors (4) and the discharge pipes (3).

5. The system as claimed in claim 1, wherein one of the connectors (4) comprises a recovery conduit (41) arranged to be connected to at least one of the perforated mini-drains (23) and a collection conduit (42) arranged to be connected to at least one of the discharge pipes (3), the interior of the recovery conduit (41) being in communication with the interior of the collection conduit (42).

6. The system as claimed in claim 5, wherein the recovery conduit (41) has form and dimensions adapted to dimensions of the perforated mini-drains (23) and the collection conduit (42) has form and dimensions adapted to dimensions of the discharge pipes (3), such that the connector (4) is arranged on a connection with the at least one of the perforated mini-drains (23) and the at least one of the discharge pipes (3) via nesting.

7. The system as claimed in claim 5, wherein the interior of the recovery conduit (41) is in communication with the interior of the collection conduit (42) by a connection conduit (43) whereof internal walls terminate on internal walls of the recovery conduit (41) and of the collection conduit (42).

8. The system as claimed in claim 7, wherein each of the recovery conduit (41), the collection conduit (42), and the connection conduit (43) is oriented according to a respective longitudinal axis (A41, A42, A43) and the connection conduit (43) is arranged so that the longitudinal axis of the connection conduit (A43) is non parallel to the longitudinal axes (A41, A42) of the recovery conduit (41) and the collection conduit (42) and crosses a transversal cross-section of at least one of the recovery conduit (41) or the collection conduit (42) near the periphery of the transversal cross-section.

9. A fluid recovery geocomposite (2), intended for fluid recovery in aggregates (S), the geocomposite comprising:
- a through layer having permeability adapted to the passage of fluid (G, L) and fitted with perforated mini-drains (23); and
- a barrier layer having permeability adapted to the blockage of fluid (G, L) and needle-bonded with a through layer (22) except at a level of the mini-drains (23), such that the barrier layer (5) forms a barrier to the passage of fluids (G, L) only at the level of the mini-drains (23), the geocomposite (2) being able to be placed with the barrier layer (5) above the through layer (22) during fluid recovery in the aggregates (S).

10. A method for fluid recovery in aggregates (S), the method comprising:
- laying (51), in contact with the aggregates (S), a geocomposite (2) comprising a through layer and perforated mini-drains (23);
- laying (52) discharge pipes (3) connected to at least one pumping device (6);
- connecting (53) the perforated mini-drains (23) to the discharge pipes (3) by adapted connectors (4); and
- laying (56) a barrier layer (5) above the through layer (22) and the perforated mini-drains (23), the barrier layer (5) being needle-bonded on the through layer (22) except at a level of the mini-drains (23), so as to form a barrier to the passage of fluids (G, L) only about the mini-drains (23), thereby allowing a fluid (G, L) present in the aggregates (S) to reach the interior of the perforated mini-drains (23) and be discharged to the at least one pumping device (6).

11. The method as claimed in claim 10, wherein the connecting (53) comprises nesting a recovery conduit (41) of one of the connectors (4) with one of the perforated mini-drains based on form and dimensions of the recovery conduit (41) adapted to dimensions of the one of the perforated mini-drains (23) and nesting a collection conduit (42) of the one of the connectors (4) with one of the discharge pipes (3) based on form and dimensions of the collection conduit (42) adapted to dimensions of the one of the discharge pipes (3).

12. The method as claimed in claim 10, wherein the laying (51) of the geocomposite and the laying (56) of the barrier layer (5) are executed simultaneously due to the fact that the barrier layer (5) is integrated into the geocomposite (2).

13. The method as claimed in claim 10, the method further comprising executing successive iterations of the method for strips of the geocomposite (2) and of the barrier layer (5) distributed within the aggregates, the iterations corresponding to successive steps of depositing (57) strata of the aggregates (S).

14. The method as claimed in claim 10, the method further comprising executing the method at the surface of the aggregates (S) to cover the aggregates with a cover comprising the geocomposite (2) and the barrier layer (5).

15. The system as claimed in claim 1, a connector of the connectors comprising:
- a recovery conduit (41) arranged to be connected to one of the perforated mini-drains (23) of the geocomposite (2); and
- a collection conduit (42) arranged to be connected to one of the discharge pipes (3) connected to the pumping device (6), an interior of the recovery conduit (41) being in communication with an interior of the collection conduit (42), such that fluid, present in the aggregates (S) and reaching an interior of one of the mini-drains (23), is discharged to the pumping device (6).

16. The system as claimed in claim 15, wherein the recovery conduit (41) has form and dimensions adapted to dimensions of the perforated mini-drains (23) and the collection conduit (42) has form and dimensions adapted to dimensions of the discharge pipes (3), such that the connector (4) is arranged on a connection via nesting with the mini-drains (23) and the discharge pipes (3).

17. The system as claimed in claim 15, wherein the interior of the recovery conduit (41) is in communication with the interior of the collection conduit (42) by a connection conduit (43) whereof internal walls terminate on internal walls of the recovery conduit (41) and of the collection conduit (42).

18. The system as claimed in claim 17, wherein each of the recovery conduit (41), the collection conduit (42), and the connection conduit (43) is oriented according to a respective longitudinal axis (A41, A42, A43) and the connection conduit (43) is arranged so that the longitudinal axis of the connection conduit (A43) is non parallel to the axes (A41, A42) of the recovery conduit (41) and the collection conduit (42) and crosses a transversal cross-section of at least one of the recovery conduit (41) or the collection conduit (42) near the periphery of the transversal cross-section.

19. The system as claimed in claim 6, wherein the interior of the recovery conduit (41) is in communication with the interior of the collection conduit (42) by at least one connection conduit (43) whereof internal walls terminate on internal walls of the recovery conduit (41) and of the collection conduit (42).

* * * * *